(12) United States Patent
Yamamoto et al.

(10) Patent No.: US 8,393,452 B2
(45) Date of Patent: Mar. 12, 2013

(54) ONE WAY CLUTCH (75) Inventors: Norihiro Yamamoto, Fukuroi (JP);
Yukiyoshi Suzuki, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 195 days.

(21) Appl. No.: 12/856,638

(22) Filed: Aug. 14, 2010

(65) Prior Publication Data
US 2011/0048886 A1 Mar. 3, 2011

(30) Foreign Application Priority Data

Aug. 27, 2009 (JP) ................................. 2009-197093

(51) Int. Cl.
*F16D 3/34* (2006.01)

(52) U.S. Cl. .......................................................... 192/45

(58) Field of Classification Search ............. 192/45.015, 192/45.004, 45.001, 45.006, 45.008
See application file for complete search history.

(56) References Cited

U.S. PATENT DOCUMENTS

| | | | | |
|---|---|---|---|---|
| 6,338,402 | B1 * | 1/2002 | Muramatsu et al. | 192/45.011 |
| 7,040,469 | B2 * | 5/2006 | Shirataki et al. | 192/45.011 |
| 2002/0195306 | A1 * | 12/2002 | Ando et al. | 192/45 |

FOREIGN PATENT DOCUMENTS

JP 2004-308719 A 11/2004

* cited by examiner

*Primary Examiner* — David D Le
*Assistant Examiner* — David J Hlavka
(74) *Attorney, Agent, or Firm* — Miles and Stockbridge P.C.

(57) ABSTRACT

In a one way clutch shipped and transported in a sub-assembly state in which one of inner ring and outer ring is assembled in a later stage. The retainer has pockets radially passing therethrough at predetermined intervals and columns between the adjacent pockets. The circumferential length of each column is so designed as to cause the biasing members, each having a spring force that allows reduction of drug, to exert a biasing force that is so strong that the torque transmission members are prevented by biasing by the biasing members from being dislocated in the sub-assembly state. The circumferential width of an engagement projection of a block bearing is smaller than that of a groove in one of the rings. When a torque greater than a predetermined level is input, the retainer shifts by a distance equal to a gap between the engagement projection and an end of the groove.

3 Claims, 8 Drawing Sheets

ONE WAY CLUTCH

This application claims the benefit of Japanese Patent Application No. 2009-197093 which is hereby incorporated by reference.

TECHNICAL FIELD

The present invention relates to a one way clutch that can be suitably used in an automatic transmission of an automobile or other equipment.

BACKGROUND ART

Automatic transmissions of vehicles use a one way clutch that transmits torque of the driving side when rotating in one direction and does not transmit torque when rotating in the reverse direction.

Figure 7:
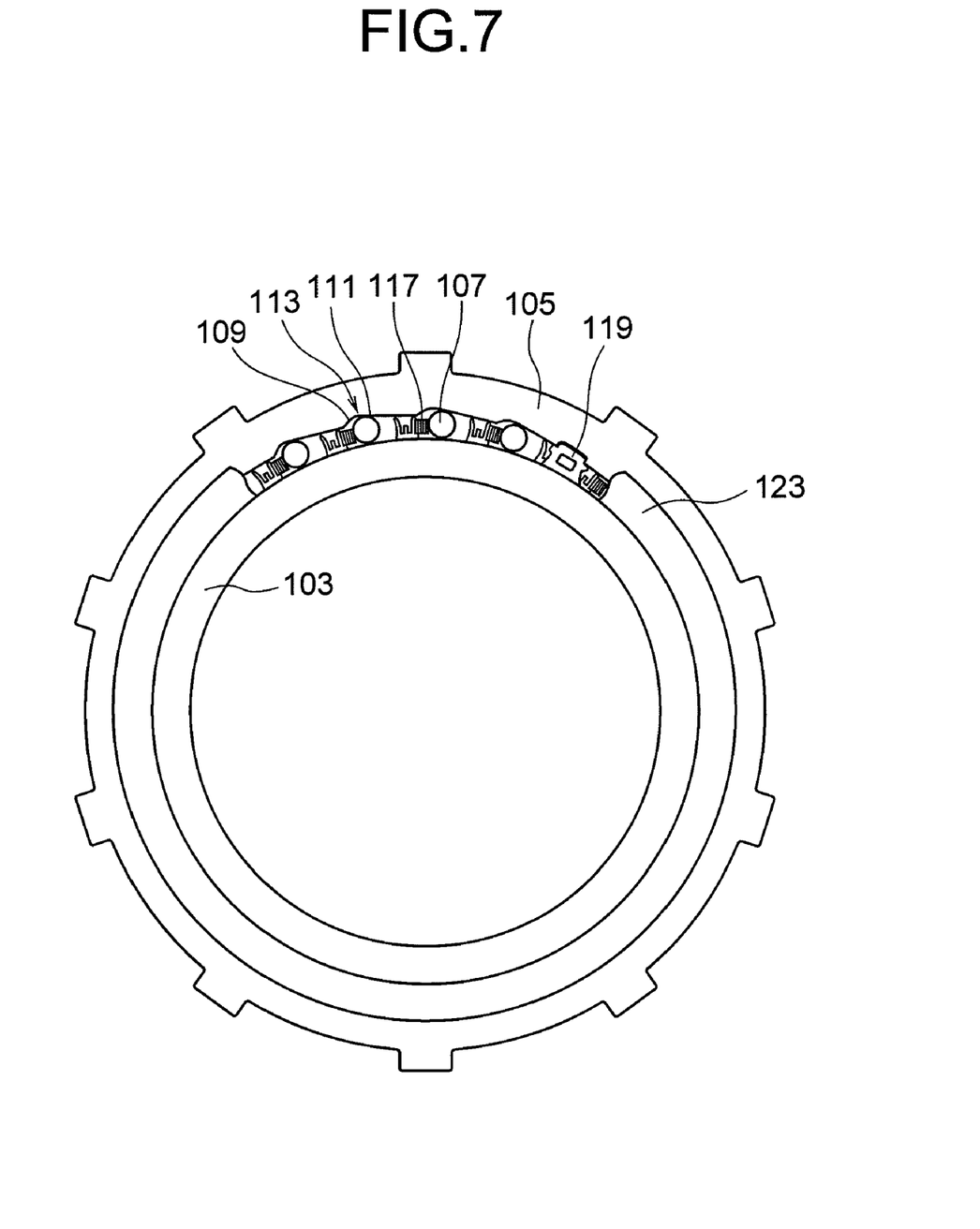
FIG. 7 is a partially cut-away front view of a conventional one way clutch.

An example of conventional one way clutches is shown in FIG. 7. This one way clutch comprises an inner ring 103, an outer ring 105 disposed coaxially with the inner ring 103, a plurality of cam surfaces 113 provided along the circumferential direction on the inner circumferential surface of the outer ring 105, each including a recessed portion 109 and a slope 111, torque transmission members 107 interposed between the cylindrical surface on the outer circumference of the inner ring 103 and the aforementioned cam surfaces 113, biasing members 117 that bias the respective torque transmission members 107 against the slopes 111 of the cam surfaces 113, and a retainer 123 that retains the torque transmission members 107 and the biasing members 117.

Figure 8:
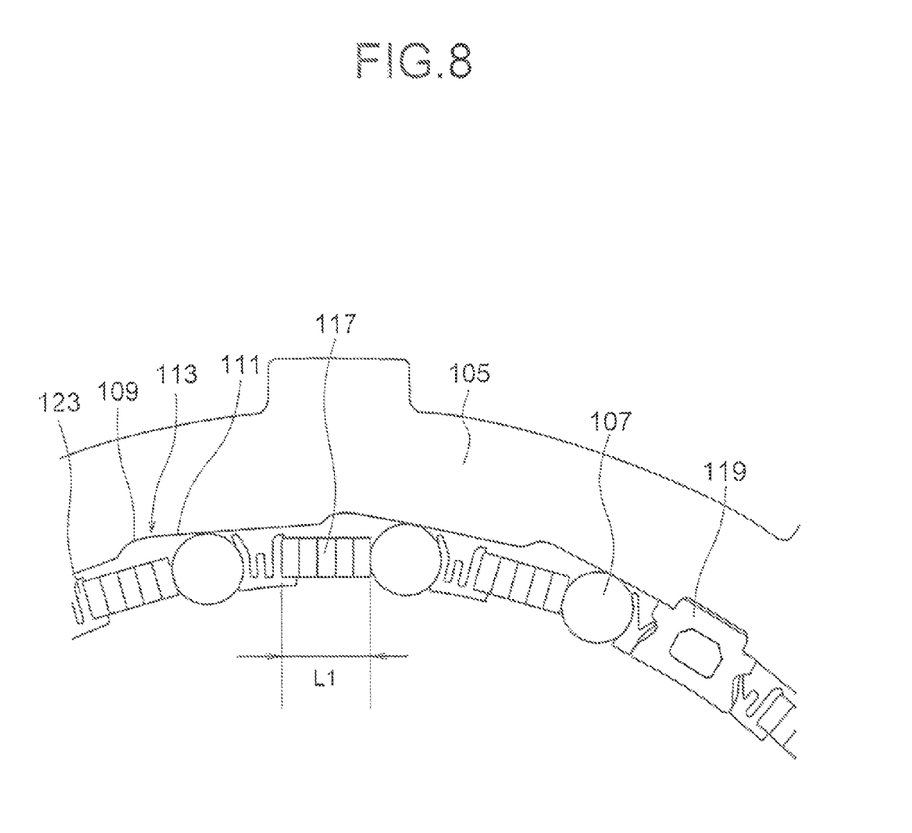
FIG. 8 is an enlarged view showing a relevant portion of the conventional one way clutch in a sub-assembly form.

When the inner ring 103 rotates in one direction, the biasing members 117 biases the torque transmission members 107 against the slopes 111 of the corresponding cam surfaces 113. Thus, the torque transmission members 107 are made integral with the inner ring 103 and the outer ring 105 to transmit torque. On the other hand, when the inner ring 103 rotates in the reverse direction, the torque transmission members 107 compress the corresponding biasing members 117 to enter the recessed portions 109 of the corresponding cam surfaces 113. This allows relative rotation of the inner ring 103 and the outer ring 105, resulting in idle rotation of the inner ring 103 and disabling torque transmission. FIG. 8 is an enlarged partial view showing the relevant portion of the above-described conventional one way clutch in a sub-assembly state, namely showing an intermediate assembly that has not been assembled to an automatic transmission or other equipment yet.

Japanese Patent Application Laid-Open No. 2004-308719 discloses a one way clutch in which a gap is provided between an engagement projection that is provided on the radially outward end face of a block bearing facing the outer ring and a retaining groove that is provided on the outer ring to engage the engagement projection, in order to prevent a torque transmission member from overrunning to damage a retainer when excessively high torque is input.

SUMMARY OF THE INVENTION

Conventional one way clutches suffer from a problem that drag or surplus drag torque acts on the torque transmission members during the shift from a torque transmission state in which the inner ring and the outer ring are in engagement with each other via the torque transmission members to a non-transmission state in which the inner ring and the outer ring are not in engagement. To reduce such drag, the spring force of springs that serve as biasing members may be made smaller. However, before assembled to an automatic transmission or other equipment, one way clutches are in the form of intermediate assemblies or sub-assemblies comprising, as shown in FIG. 8, an outer ring 105 having recessed cams 109 provided on its inner circumferential surface, a retainer 123 attached on the inner circumferential surface of the outer ring 105 via block bearings 119, and biasing members 117 and torque transmission members 107 retained by the retainer 123. Specifically, one way clutches are shipped from a factory in the form of such sub-assemblies and assembled to components of automatic transmissions or other equipment that constitute inner rings in another factory. If springs having a low spring force are used as the biasing members 117, there is a risk that torque transmission members 107 may be dislocated during transportation of one way clutches in the form of sub-assemblies. The dislocation of torque transmission members 107 requires re-assembly of them or may cause breakage of them.

The present invention has been made in view of the above-described situations. An object of the present invention is to provide a one way clutch that uses, as biasing members, springs adapted to reduce drag that have a spring force smaller than that of "biasing members not adapted to reduce drag" that have been generally used in this type of one way clutches, can prevent dislocation of torque transmission members reliably when in a sub-assembly form, and provides adequate torque transmission with reduced drag when assembled to a vehicle. (In the context of this specification, biasing members that have been generally used in one way clutches that have been used in the applications same as the one way clutch according to the present invention is referred to as "biasing member not adapted to reduce drag".)

To achieve the above object, according to the present invention, there is, provided a one way clutch comprising, an inner ring, an outer ring disposed coaxially with said inner ring, a plurality of concave cams provided on one of an outer circumferential surface of said inner ring and an inner circumferential surface of said outer ring, each cam including a recessed portion and a slope, a plurality of torque transmission members interposed between the other of the outer circumferential surface of said inner ring and the inner circumferential surface of said outer ring and the concave cams, a plurality of biasing members that are respectively paired with said torque transmission members and bias said torque transmission members toward the slopes in said concave cams, a block bearing that maintains a space between said inner ring and said outer ring with respect to a radial direction, and a retainer disposed between said inner ring and said outer ring to retain said torque transmission members and said biasing members, wherein said torque transmission members roll in said concave cams against the biasing force of said biasing members only when said inner ring and said outer ring turn in one direction, to transmit torque between said inner ring and said outer ring, the one way clutch is shipped and transported in a sub-assembly state in which said one of the inner ring and the outer ring, said torque transmission members, said biasing members, said block bearing, and said retainer are assembled together, and said other of the inner ring and the outer ring is assembled in a later stage, a groove that holds said block bearing is provided on said one of the outer circumferential surface of said inner ring and the inner circumferential surface of said outer ring, and engagement projection that engages with said groove is provided on said block bearing, said biasing members are springs having a spring force that allows reduction of drag, said retainer has pocket portions that radially pass through it and are arranged at predetermined intervals and column portions that extend in an axial direction and are provided between the adjacent pocket portions, the lengths of said column portions along a circumferential direction are designed in such a way as to cause said biasing members to exert a biasing force that is so strong that said torque transmission members are prevented by biasing by said biasing members from being dislocated in said subassembly state, and the width of said engagement projection along the circumferential direction is smaller than the width of said groove along the circumferential direction, and when a torque greater than a predetermined level is input, said retainer can shift by a distance equal to a gap between said engagement projection and said groove.

According to one aspect of the present invention, in the above-described one way clutch according to the present invention, said pocket portions comprise a first pocket portion for said block bearing and second pocket portions for said torque transmission members, said column portions comprise first column portions that constitute a pair that defines said first pocket portion and second column portions other than the first column portion, each of said second column portions being provided with a projecting portion for securing the torque transmission member and a projecting portion for securing and holding the biasing member that are arranged in order along the circumferential direction, one of the first column portions that constitute the pair is provided with a projecting portion for securing and holding the biasing member, and the other of the first column portions that constitute the pair is provided with a projecting portion for securing the torque transmission member, and said paired torque transmission members and biasing members are held between the projecting portion for securing and holding the biasing member provided on said one of the first column portions and the projecting portion for securing the transmission member provided on the adjacent second column portion, between the projecting portion for securing the torque transmission member and the projecting portion for securing and holding the biasing member provided respectively on the adjacent second column portions, and between the projecting portion for securing the torque transmission member provided on said other of the first column portions and the projecting portion for securing and holding the biasing member provided on the adjacent second column portion, and the distance between said projecting portion for securing the torque transmission member and said projecting portion for securing and holding the biasing member on each of the second column portions is designed in such a way as to cause said biasing members to exert a biasing force that is so strong that said torque transmission members are prevented by biasing by said biasing members from being dislocated in said sub-assembly state.

According to the present invention, there can be provided a one way clutch that can prevent dislocation of a torque transmission member from occurring reliably in a sub-assembly state and provides sufficient torque transmission with reduced drag in the state in which it is assembled to a vehicle.

DESCRIPTION OF THE EMBODIMENT

In the following, a one way clutch according to an embodiment of the present invention will be described with reference to the drawings.

Figure 1:
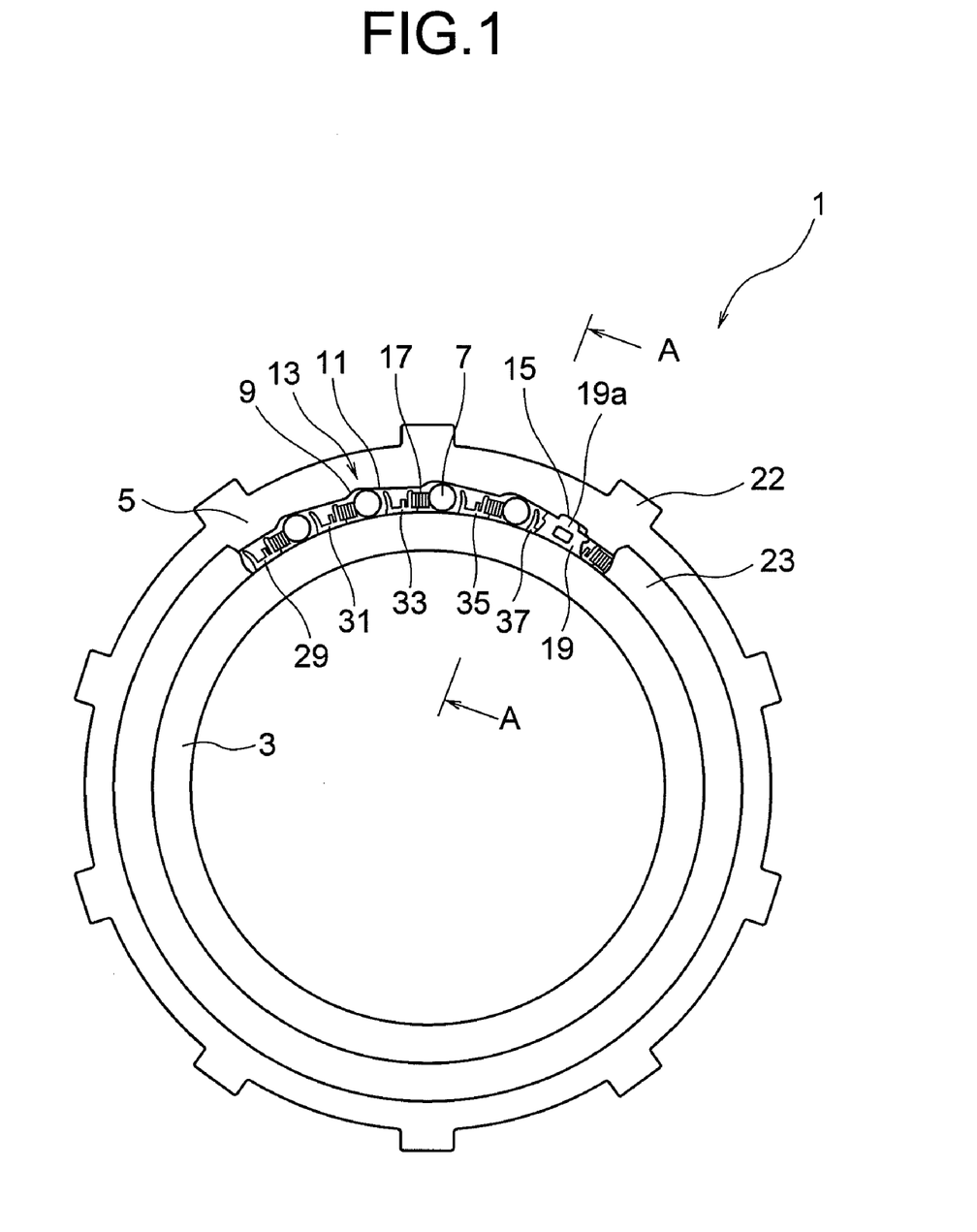
FIG. 1 is a partially cut-away front view of a one way clutch according to an embodiment of the present invention.
Figure 2:
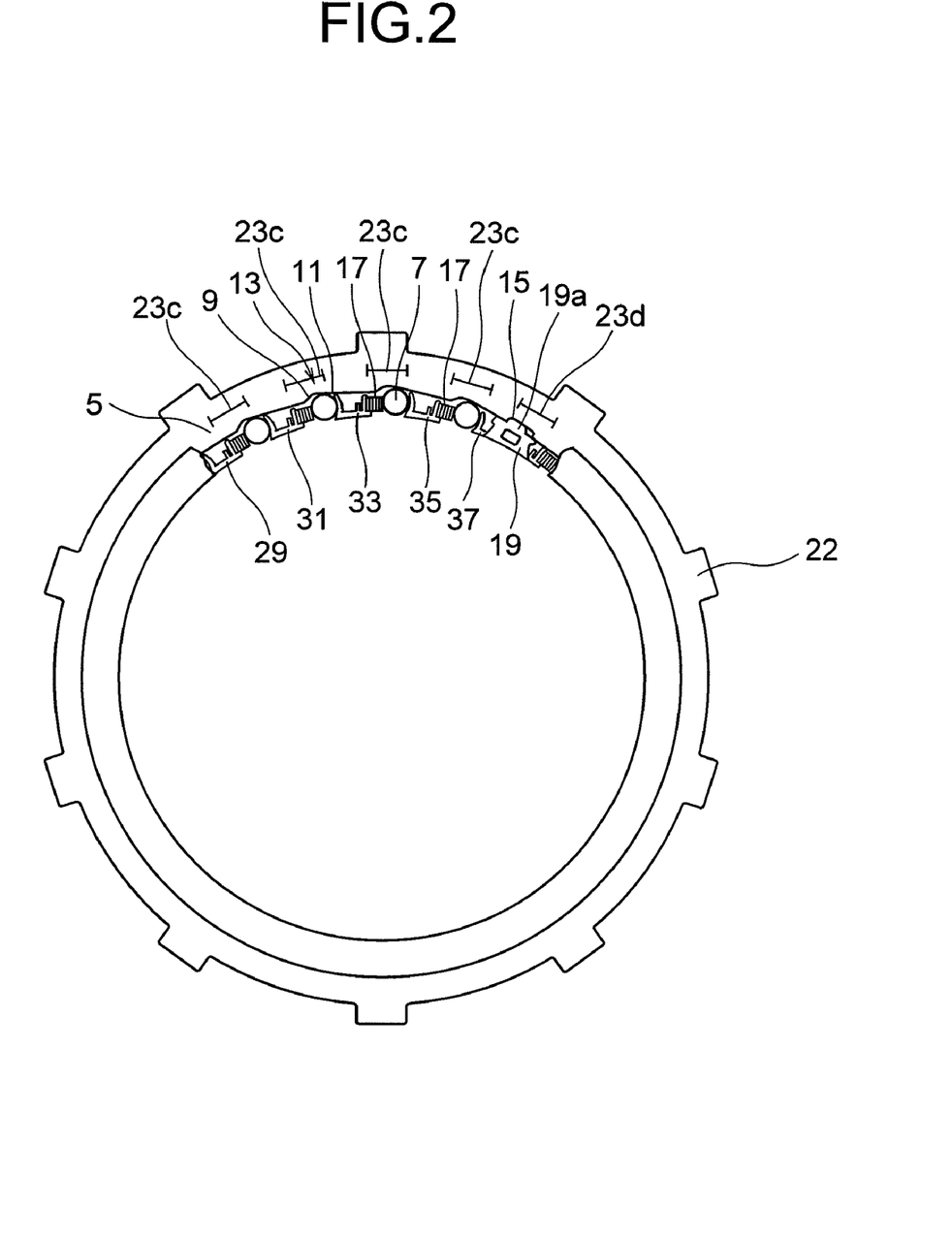
FIG. 2 is a partially cut-away overall view of the one way clutch according to the embodiment in a sub-assembly state.
Figure 3:
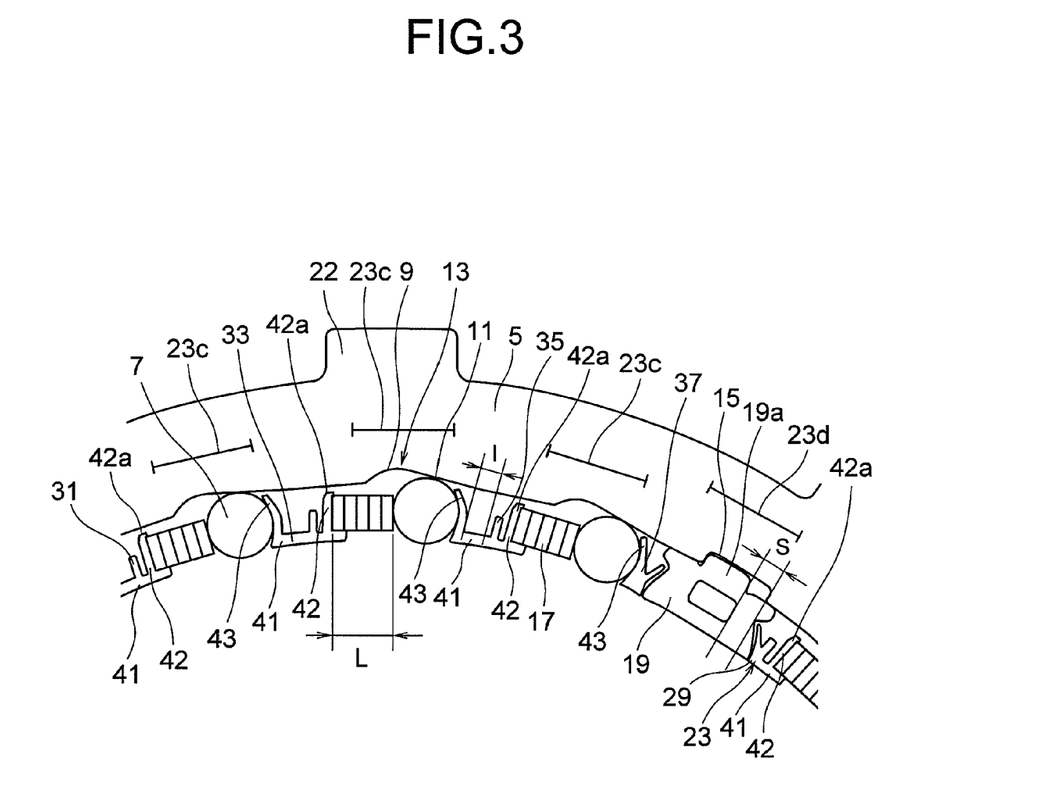
FIG. 3 is an enlarged view showing a relevant portion of FIG. 2.
Figure 4:
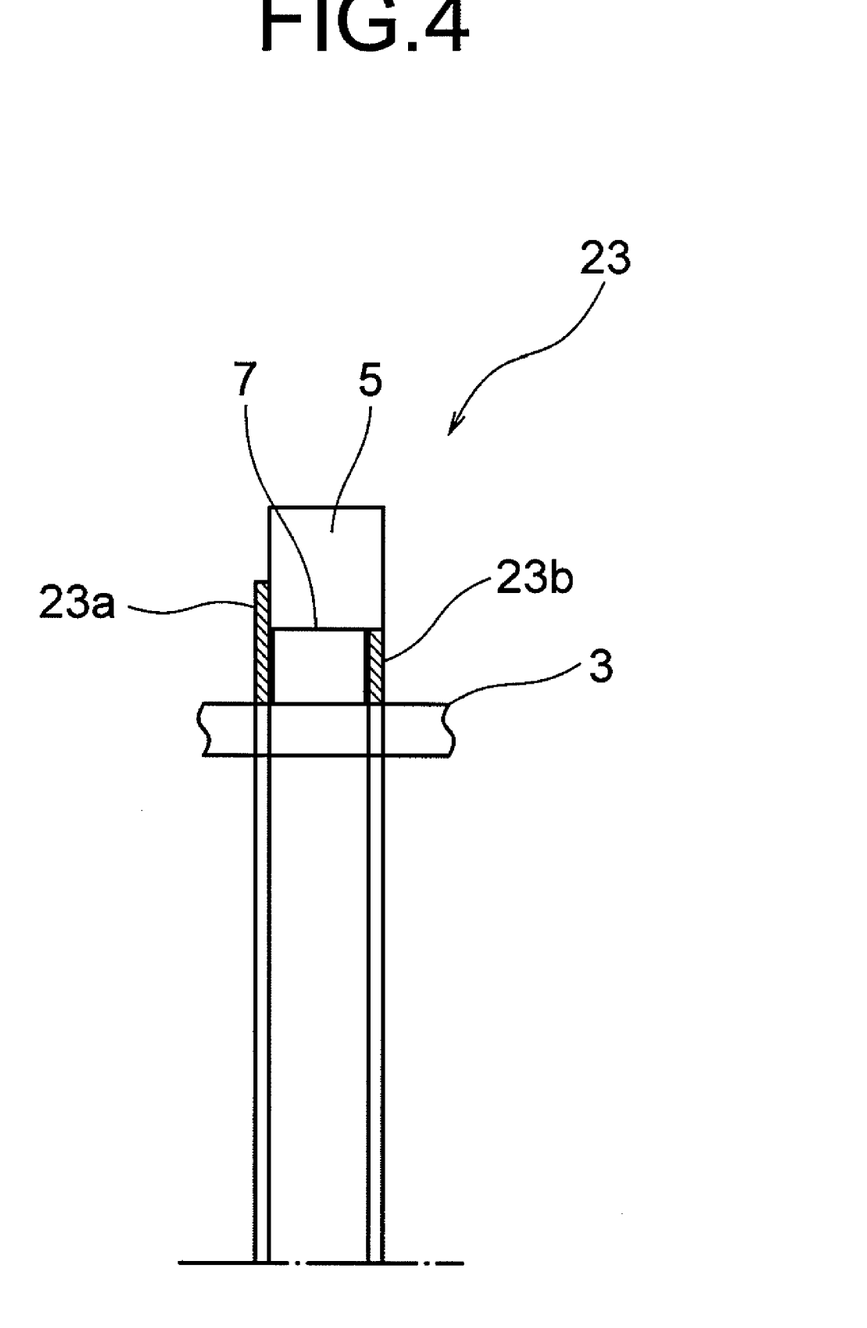
FIG. 4 is a cross sectional view seen from the direction indicated by arrows A in FIG. 1.
Figure 5:
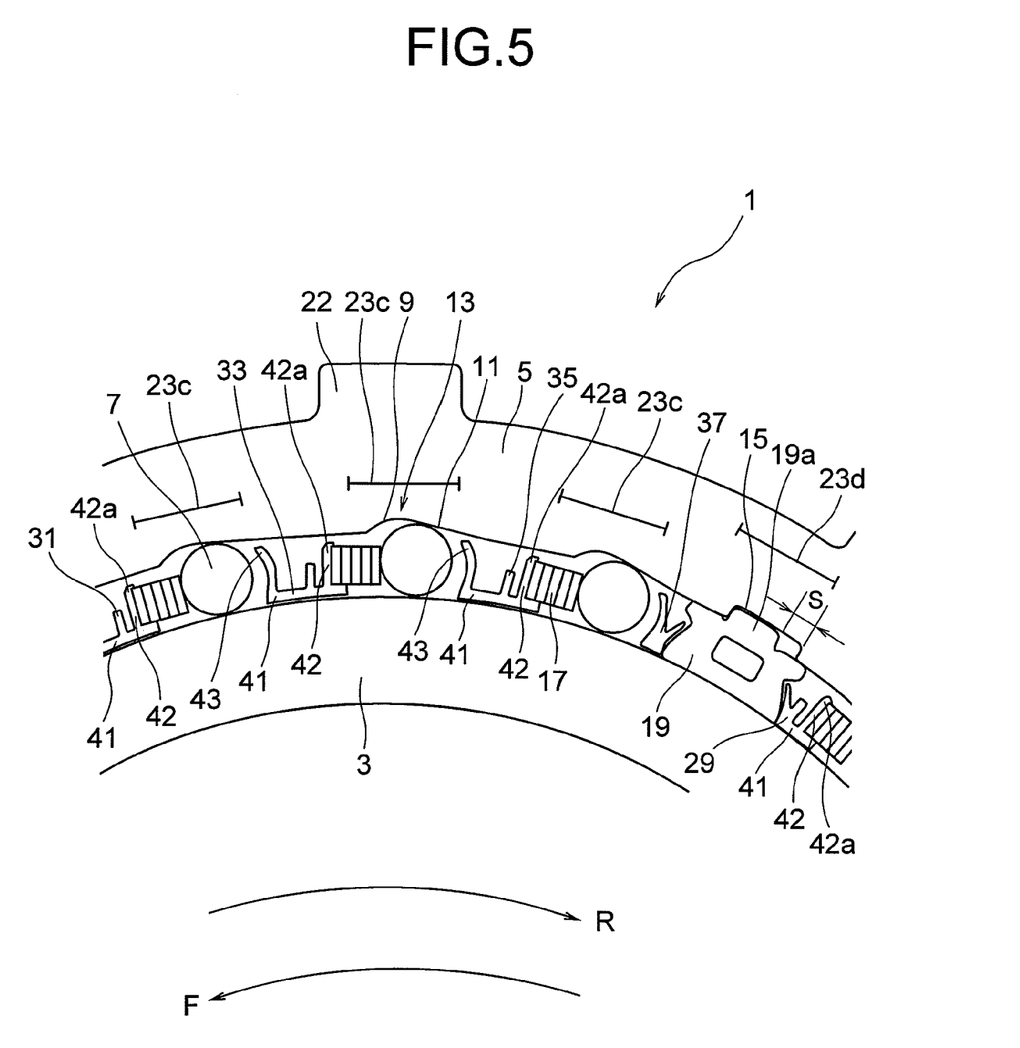
FIG. 5 is an enlarged view showing a relevant portion of the one way clutch according to the embodiment of the present invention upon input of torque.
Figure 6:
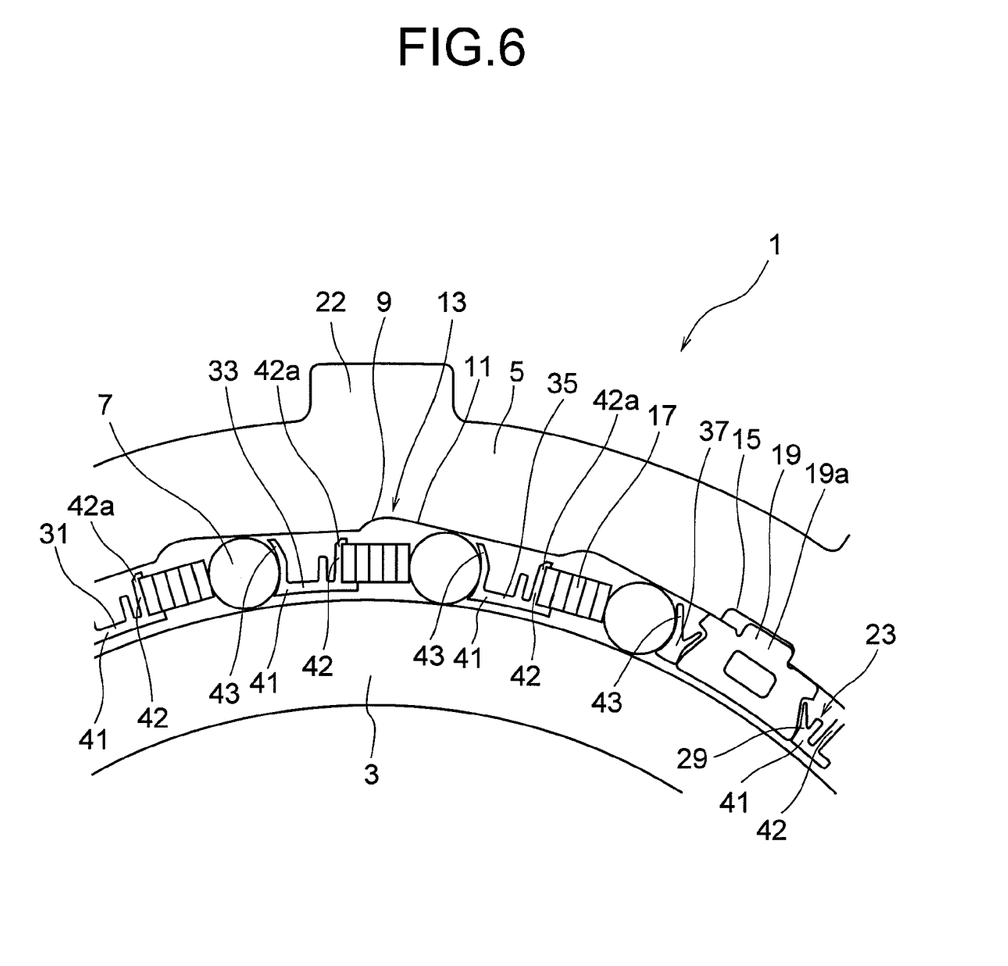
FIG. 6 is an enlarged view showing a relevant portion of the one way clutch according to the embodiment of the present invention upon input of certain torque.

A preferred embodiment of the present invention will be described with reference to the drawings. FIG. 1 is a partially cut-away front view of a one way clutch according to an embodiment of the present invention. FIG. 2 is a partially cut-away overall view of the one way clutch according to the embodiment in a sub-assembly state. FIG. 3 is an enlarged view showing a relevant portion of FIG. 2. FIG. 4 is a cross sectional view seen from the direction indicated by arrows A in FIG. 1. FIG. 5 is an enlarged view showing a relevant portion of the one way clutch according to the embodiment of the present invention upon input of torque. FIG. 6 is an enlarged view showing a relevant portion of the one way clutch according to the embodiment of the present invention upon input of certain torque. FIG. 7 is a partially cut-away front view of a conventional one way clutch. FIG. 8 is an enlarged view showing a relevant portion of the conventional one way clutch in a sub-assembly form.

As shown in FIG. 1, the one way clutch 1 comprises a cylindrical inner ring 3 having a smooth outer circumferential surface, an annular outer ring 5 that is disposed coaxially with the inner ring 3 and rotatable relative to the inner ring 3, a number of cylindrical rollers 7 that are interposed between the inner ring 3 and the outer ring 5 to serve as torque transmission members, and other members. As shown in FIG. 1, on the inner circumferential surface of the outer ring 5 are provided a plurality of concave cams 13 along the circumferential direction and a plurality of grooves 15 extending along the axial direction and arranged at predetermined angular intervals. Each concave cam 13 is composed of a recessed portion 9 and a slope 11. An engagement projection 19*a* of a block bearing 19 is fitted in each groove 15. As shown in FIG. 1, the outer ring 5 has engagement teeth 22 provided on the outer circumference thereof. The engagement teeth 22 engage with engagement grooves provided on the inner circumference of a transmission element that is not shown in the drawings.

A retainer 23 made of a synthetic resin is attached to the outer ring 5. The retainer 23 retains the rollers 7, accordion springs 17, and block bearings 19 between the inner ring 3 and the outer ring 5.

The one way clutch 1 has the above-described structure as a finished assembly that is assembled to an automatic transmission or other equipment. Before assembly to an automatic transmission or other equipment, it is shipped as an intermediate assembly or sub-assembly that lacks the inner ring 3 as shown in FIGS. 2 and 3, and assembled to the inner ring 3 in another factory to constitute the finished one way clutch shown in FIG. 1.

In recent years, one way clutches of this type with as small drag as possible have been demanded. While the one way clutch 1 according to this embodiment is designed to have reduced drag, it has adequate performance as a replacement for a conventional one way clutch and can be used in the same applications as conventional one way clutches.

In the one way clutch 1 according to the embodiment, the cylindrical rollers 7 serving as torque transmission members and the accordion springs 17 or compression springs that are paired with the respective rollers and bias the rollers 7 against the slopes 11 in the concave cams 13 are provided between the outer circumferential surface of the inner ring 3 and the concave cams 13. The accordion spring 17 used here is one adapted to reduce drag that has a spring force smaller than that of springs not adapted to reduce drag that are commonly used in conventional mass-produced one way clutches. Although the cylindrical rollers are used as the torque transmission members in this embodiment, steel balls or other parts may be used instead of the rollers.

The one way clutch 1 according to the embodiment has twenty concave cams 13, twenty accordion springs 17, and twenty rollers 7. The numbers of the concave cams 13, accordion springs 17, and rollers 7 are not limited to 20, but they may be changed fitly in accordance with the application.

There are five grooves 15, which are arranged at angular intervals of 72 degrees at positions different from the concave cams 13 along the circumferential direction on the inner circumferential surface of the outer ring 5. The engagement projection 19a of the block bearing 19 engages with each groove 15. A space in the radial direction between the inner ring 3 and the outer ring 5 is maintained by the block bearings 19.

The retainer 23 is composed of a first annular side portion 23a having a larger diameter and a second annular side portion 23b having a smaller diameter that extend radially respectively on different sides of the outer ring 5 with respect to the axial direction as shown in FIG. 4, and first to fifth columns 29, 31, 33, 35, 37 extending in the axial direction that link the side portions 23a, 23b as shown in FIGS. 1 to 4. Thus, pockets (indicated diagrammatically at 23c and 23d) that pass through the retainer 23 along radial directions are formed between the adjacent columns. The first columns 29, the second columns 31, the third columns 33, the fourth columns 35, and the fifth column 37 are arranged in the mentioned order repetitively along the entire circumference of the retainer 23.

As shown in FIGS. 2 and 3, in the embodiment, the rollers 7 are respectively placed in the pockets 23c formed between the first column 29 and the second column 31, between the second column 31 and the third column 33, between the third column 33 and the fourth column 35, and between the fourth column 35 and the fifth column 37. The rollers 7 are biased by the respective corresponding springs 17. A block bearing 19 is placed in and passes through the pocket 23d formed between the fifth column 37 and the first column 29 along a radial direction.

In this embodiment, the first column 29 (see the rightmost portion of FIG. 3) has a base portion 41 extending along the inner ring 3 and an accordion spring securing portion 42 extending in the radial direction from the base portion 41 toward the outer ring 5. The spring securing portion 42 has a securing piece 42a for securing the accordion spring 17 at its radially outer end facing the outer ring 5. In this embodiment, the second column 31, the third column 33, and the fourth column 35 have the same shape. The second column 31, the third column 33, and the fourth column 35 each has a base portion 41, a spring securing portion 42, and a roller holding portion 43 facing the pocket 23c on the left side and extending in the radial direction from the inner ring 3 side toward the outer ring 5. The fifth column 37 has only the roller holding portion 43.

The spring securing portion 42 of the first column 29 and the roller holding portion 43 of the adjacent second column 31 hold paired roller 7 and accordion spring 17 between them. Similarly, the spring securing portion 42 of the second column 31 and the roller holding portion 43 of the adjacent third column 33 hold paired roller 7 and accordion spring 17 between them, the spring securing portion 42 of the third column 33 and the roller holding portion 43 of the adjacent fourth column 35 hold paired roller 7 and accordion spring 17 between them, and the spring securing portion 42 of the fourth column 35 and the roller holding portion 43 of the adjacent fifth column 37 hold paired roller 7 and accordion spring 17 between them. Thus, one end of each accordion spring 17 is secured by the securing piece 42a of the spring securing portion 42, and the other end of the accordion spring 17 presses the roller 7 whose radially inner portion passes through the pocket 23c.

As shown in FIG. 3, in this embodiment, the positions of the roller holding portions 43 of the second column 31, the third column 33, and the fourth column 35 are respectively displaced along the circumferential direction from the spring securing portions 42 of the second column 31, the third column 33, and the fourth column 35 as compared to those in conventional mass-produced one way clutches not adapted to reduce drag. Consequently, the distance between the spring securing portion 42 and the roller holding portion 43 of the same column in this embodiment is larger by length "l" (see the fourth column 35 shown at approximately the center of FIG. 3) than that in retainers commonly used in conventional mass-produced one way clutches not adapted to reduce drag. With the increase in the lengths of the second column 31, the third column 33, and the fourth column 35 along the circumferential direction by "l", the set lengths of all the accordion springs 17 arranged along the circumference are made shorter, so that each accordion spring 17 exerts a biasing load substantially equal to that exerted by springs that are commonly used in conventional mass-produced one way clutch not adapted to reduce drag, thereby preventing dislocation or drop-off of rollers 7 in the sub-assembly state. In this embodiment, since the accordion springs 17 having smaller spring force are used in order to reduce drag, there is a risk that rollers 7 may drop off or be dislocated in the sub-assembly state if the structure of the retainer is the same as that of the retainer commonly used in conventional mass-produced one way clutches not adapted to reduce drag. In view of this, the distance between the spring securing portion 42 and the roller holding portion 43 of the same column is made longer to increase the length of the column along the circumferential direction, thereby making the set length L of each accordion spring 17 in the sub-assembly state in which the one way clutch has been assembled to the retainer 23 but not yet assembled to the inner ring 3 shorter than the set length L1 (see FIG. 8) of the spring in the conventional mass-produced one way clutch not adapted to reduce drag in the sub-assembly state. With this arrangement, the biasing load that the accordion spring 17 exerts on the roller 7 can be made stronger to prevent dislocation of the roller 7 in the sub-assembly state.

Although a reduction in drag and prevention of dislocation of rollers 7 in the sub-assembly state can be achieved with the above-described arrangement, there remains a problem in the function as the one way clutch. In view of this, in the embodiment, a gap S is provided between the engagement projection 19a of the block bearing 19 and the groove 15 of the outer ring 5. This will be described in the following in detail.

The end faces of the block bearing 19 with respect to the circumferential direction are tapered from the inner ring 3 side toward the outer ring 5 side, and the radially outer end face of the block bearing 19 facing the outer ring 5 has the engagement projection 19a for engagement with the groove 15.

The width of the engagement projection 19a along the circumferential direction is smaller than the width of the groove 15 along the circumferential direction so that the engagement projection 19a can shift in the groove 15 along the circumferential direction when a torque greater than a predetermined level is input. Thus, there is a gap S between the engagement projection 19a and the groove 15 in the state in which the block bearing 19 is assembled to the outer ring 5.

In this embodiment, the distance between the spring securing portion 42 and the roller holding portion 43 of the second column 31, the third column 33, and the fourth column 35 is larger by length "l" than the distance between the spring securing portion and the roller holding portion in the retainer commonly used in conventional mass-produced one way clutch not adapted to reduce drag, and the aforementioned gap S is designed, preferably, to be 1 to 1.5 times the aforementioned length "l". The block bearing 19 is attached to the retainer 23 in such a way that the engagement projection 19a will shift in the groove 15 along the circumferential direction only when a torque greater than the predetermined level is input.

The operation of the one way clutch 1 according to the embodiment upon input of a torque will be described with reference to FIGS. 5 and 6. As the inner ring 3 turns in the direction indicated by arrow R (which indicates the inner ring locking direction) in FIG. 5 relative to the outer ring 5, the accordion springs 17 bias the rollers 7 against the slopes 11. This makes the rollers 7, the inner ring 3, and the outer ring 5 integral, and torque is transmitted by them. On the other hand, arrow F indicates the inner ring idling direction in which the inner ring turns freely and torque is not transmitted. When the inner ring 3 turns in the direction indicated by arrow F relative to the outer ring 5, the rollers 7 move away from the slopes 11, while compressing the accordion springs 17, to enter the recessed portions 9. Then, the inner ring 3 is in a freely turning state, and torque is not transmitted.

Since the width of the engagement projection 19a of the block bearing 19 along the circumferential direction is smaller than the width of the groove 15 along the circumferential direction, when a torque greater than the predetermined level is input from the inner ring 3 to the outer ring 5, the engagement projection 19a of the block bearing 19 shifts along the circumferential direction in the groove 15, and the entire retainer 23 turns in the circumferential direction by a distance equal to the gap S. Thus, the state shown in FIG. 6 is achieved.

As described above, according to the embodiment, the retainer 23 is adapted to slide along the circumferential direction by a distance equal to the gap S when a torque greater than the predetermined level is input. By this feature, while the lengths of the second column 31, the third column 33, and the fourth column 35 along the circumferential direction are made larger by the increase in the distance between the spring securing portion 42 and the roller holding portion 43, an adequate distance is provided for rolling of the rollers 7. In consequence, the one way clutch according to the embodiment can have a torque capacity substantially equal to that of conventional mass-produced one way clutches of this type that are not adapted to reduce drag.

According to the embodiment, sliding of the retainer 23 along the circumferential direction by a distance equal to the gap S upon input of a torque greater than the predetermined level stabilizes or reduces variations in the set lengths of the accordion springs 17 while the inner ring and the outer ring engage with each other via the rollers 7. Consequently, the biasing load exerted by the accordion springs 17 on the rollers 7 is made stable, and a strong engagement force can be maintained.

Although a specific embodiment has been described, the present invention is not limited to the embodiment. In the embodiment, the lengths of the columns along the circumferential direction are made larger by the increased distance between the spring securing portion and the roller holding portion of the same column as compared to the retainer used in conventional mass-produced one way clutches not adapted to reduce drag, so that the set lengths of all the accordion springs arranged along the circumference of the one way clutch in the sub-assembly state are made shorter. However, this does not exclude use of column with only one of the spring securing portion and the roller holding portion having an increased length along the circumferential direction. What is taught by the present invention in this respect is to increase the length of columns of the retainer along the circumferential direction so that the biasing members can exert biasing load that can prevent dislocation of torque transmission members in the sub-assembly state. Which columns are to be made longer along the circumferential direction may be changed as appropriate in accordance with conditions of applications so long as such biasing load can be exerted by the biasing members. Although in the above-described embodiment the concave cams are provided on the inner circumferential surface of the outer ring, the inner circumferential surface of the outer ring may be a smooth cylindrical surface, and the concave cams may be provided on the outer circumferential surface of the inner ring. Although accordion springs are used as the springs that bias the rollers in the above-described embodiment, other types of springs may also be used. The specific way of securing the springs, the number of concave cams provided on the outer or inner ring, the numbers and the positions of the rollers, the accordion springs, and the block bearings may be changed as appropriate in accordance with conditions of applications. The overall structure of the one way clutch, the specific shapes of the retainer, the inner ring, the outer ring, and the other parts are not limited to those of the above-described embodiment, but they may be changed as appropriate in accordance with design requirements.

What is claimed is:

1. A one way clutch comprising:
an inner ring;
an outer ring disposed coaxially with said inner ring;
a plurality of concave cams provided on one of an outer circumferential surface of said inner ring and an inner circumferential surface of said outer ring, each cam including a recessed portion and a slope;
a plurality of torque transmission members interposed between the other of the outer circumferential surface of said inner ring and the inner circumferential surface of said outer ring and the concave cams;
a plurality of biasing members that are respectively paired with said torque transmission members and bias said torque transmission members toward the slopes in said concave cams,
a block bearing that maintains a space between said inner ring and said outer ring with respect to a radial direction; and
a retainer disposed between said inner ring and said outer ring to retain said torque transmission members and said biasing members, wherein
said torque transmission members roll in said concave cams against the biasing force of said biasing members only when said inner ring and said outer ring turn in one direction, to transmit torque between said inner ring and said outer ring, a groove that holds said block bearing is provided on said one of the outer circumferential surface of said inner ring and the inner circumferential surface of said outer ring, and an engagement projection that engages with said groove is provided on said block bearing, said biasing members are springs having a spring force that allows reduction of drag, said retainer has pocket portions that radially pass through it and are arranged at predetermined circumferential intervals and column portions that extend in an axial direction and are provided circumferentially between adjacent pocket portions, the lengths of said column portions along a circumferential direction are designed in such a way as to cause said biasing members to exert a biasing force that is so strong that said torque transmission members are prevented by biasing by said biasing members from being dislocated in a sub-assembly state in which the one-way clutch lacks one of the inner ring and the outer ring, and the width of said engagement projection along the circumferential direction is smaller than the width of said groove along the circumferential direction, and when a torque greater than a predetermined level is input, said retainer can shift by a distance equal to a gap between said engagement projection and a circumferential end of said groove.

2. A one way clutch according to claim 1, wherein said pocket portions comprise a first pocket portion for said block bearing and second pocket portions for respective torque transmission members and corresponding biasing members, said column portions comprise first column portions that constitute a pair that defines said first pocket portion and second column portions other than the first column portion, each of said second column portions being provided with a projecting portion for securing a torque transmission member and a projecting portion for securing and holding a biasing member that are arranged in order along the circumferential direction, one of the first column portions that constitute the pair is provided with a projecting portion for securing and holding a biasing member, and the other of the first column portions that constitute the pair is provided with a projecting portion for securing a torque transmission member, and said paired torque transmission members and biasing members are held between a projecting portion for securing and holding a biasing member provided on said one of the first column portions and a projecting portion for securing a transmission member provided on an adjacent second column portion, between a projecting portion for securing a torque transmission member and a projecting portion for securing and holding a biasing member provided respectively on adjacent second column portions, and between a projecting portion for securing a torque transmission member provided on the other of the first column portions and a projecting portion for securing and holding a biasing member provided, on an adjacent second column portion, and the distance between said projecting portion for securing a torque transmission member and said projecting portion for securing and holding a biasing member on each of the second column portions is designed in such a way as to cause said biasing members to exert a biasing force that is so strong that said torque transmission members are prevented by biasing by said biasing members from being dislocated in said sub-assembly state.

3. A sub-assembly for a one-way clutch, comprising:

an outer ring adapted to be disposed coaxially with a relatively rotatable inner ring, the outer ring having a plurality of concave cams;

a retainer coaxial with the outer ring and adapted to be attached to the inner ring, wherein the retainer has a plurality of circumferentially spaced pockets, each provided with an associated pair of a roller and a biasing spring, a plurality of columns each disposed between a roller of one pair and a spring of an adjacent pair, each spring biasing the associated roller against part of a column, and wherein the circumferential lengths of said columns are such as to cause said springs to exert a biasing force that is so strong that said torque transmission rollers are prevented from being dislocated from said sub-assembly, but that is not so strong as to produce drag when said one-way clutch is shifted from an engaged state to an idle state.

* * * * *